Patented Dec. 26, 1950

2,535,475

UNITED STATES PATENT OFFICE 2,535,475

UREA FORMALDEHYDE RESINOUS PRODUCT

Bruce E. Anderson, Atlanta, Ga., assignor to Don Gavan Company, Atlanta, Ga.

No Drawing. Application December 14, 1945, Serial No. 635,106

4 Claims. (Cl. 260—29.4)

This invention relates in general to plastics and more particularly has reference to novel resinous plastic compositions and methods of making the same.

Extensive research and development has resulted in the production of large number of plastics of various types having widely varying characteristics and properties. Most of the plastics that have highly desirable characteristics and properties, such as high strength, resistance to moisture, heat, etc., are rather difficult to produce and generally expensive.

An object of this invention is to provide a moldable plastic composition having highly desirable properties and which can be made from low cost raw materials.

Another object of this invention is to provide a moldable plastic composition comprising a filler bonded with a methylolurea resin.

It is also an object of this invention to provide a moldable plastic composition comprising a resin resulting from the condensation of methylolurea and a filler or extraneous chemical incorporated therewith, and/or a methylolurea resin catalyzed by a filler or extraneous chemical.

A further object of this invention is to produce from low cost raw materials—plasticizers as well as fillers—a superior, resinous molding compound that, when molded under suitable conditions, will have the following properties: (1) high water resistance, (2) high resistance to dilute acids and alkalies, (3) low initial and final cost, (4) will color easily by the addition of suitable dyes to obtain a wide range of colors, (5) high resistance to rupture, to heat, to insects, to deformation under stress, (6) simplicity of preparation, (7) high dielectric strength, and (8) high resistance to abrasion.

Still another object of this invention is to provide methods of preparing the above molding compositions and forming the same into articles of various shapes.

A still further object of this invention is to provide procedures for effecting the solution of methylolurea and the incorporation of the solution with fillers and extraneous chemicals capable of modifying the characteristics and/or properties of the resulting products.

With these and other objects in view, the present invention resides, first, in the formation of a binder of a methylolurea resin and, secondly, the incorporation of the binder with fillers and extraneous substances to form desired products. The methylolurea resin can be made by condensing a methylolurea with a substance condensible therewith, such as lignocellulosic and/or cellulosic fibrous material employed as a filler or substance other than those employed as a filler, or with itself aided by heat and pressure.

In accordance with the present invention it has been discovered that highly desirable plastic compositions can be made from a methylolurea resin and suitable filling and modifying substances. The methylolurea resin of the present invention is formed from a methylolurea such as monomethylolurea and/or sesquimethylolurea and/or dimethylolurea and a substance that will condense therewith, or a substance that will catalyze the polymerization of the methylolurea resin alone.

It has been found that the methylolureas such as monomethylolurea and/or sesquimethylolurea and/or dimethylolurea will polymerize with and/or in the presence of several types of fibrous substances such as lignocellulosic and cellulosic materials. For instance, resins may be obtained by condensing one or more of the above-mentioned methylolureas with and/or in the presence of substances such as sawdust, wood chips, ground fiber, ramie, jute, hemp, cotton and several of the synthetic organic fibers in the form of waste rags of either staple or monofilament fibers in comminuted or ground form. The resin formed by condensation of the methylolurea with and/or in the presence of the above-mentioned class of substances is of considerable importance since it may be formed upon incorporating the methylolurea with and/or in the presence of one or more of the above substances when the latter are employed as fillers.

Apart from the catalyzing of the polymerization and/or the actual polymerizing of the methylolurea with a portion of the organic filler material, the present invention also contemplates formation of a resin between the methylolurea and some of the extraneous substances that may be incorporated with the mixture. As a matter of fact, the present invention definitely contemplates the formation of a methylolurea resin independently of a filler and the bonding of fillers with the so produced resin even though the fillers are inert to the methylolurea and form no condensation products therewith. Such resins may be condensation products between extraneous chemicals and methylolurea and/or methylolurea resins catalyzed by the extraneous chemicals. For instance, it is contemplated to utilize inorganic fibrous material such as asbestos, glass, and similar substances, as a filler of a plastic composition the bond of which is primarily a methylolurea resin.

In some instances, it has been found desirable from the point of view of economy or for modifying the properties of the product to incorporate along with the methylolurea, quantities of urea and/or casein.

It has been found that ethylene diamine serves as an effective solvent for a methylolurea such as monomethylolurea, sesquimethylolurea, and dimethylolurea. This substance will dissolve the methylolurea up to about 4 to 5 parts to 1 part of ethylene diamine. After such a solution has been formed, it may be diluted with water, isopropyl alcohol, and other substances of this type to form solutions of desired concentration.

In preparing a plastic composition in accordance with the present invention, a filler substance such as sawdust, wood chips, wood fiber, asbestos, ramie, etc., is placed in a stone mill or rod mill or similar grinding apparatus and processed for a sufficient length of time to reduce the material to a size for passage through a 40 to 80 mesh screen. During the grinding process the methylolurea such as monomethylolurea and/or sesquimethylolurea and/or dimethylolurea and other resin forming substances such as urea and/or casein are added to the mix. If, in addition to the foregoing, any other substances such as hexamethylene tetramine, zinc stearate, or ammonium hydroxide are added to obtain specific desired properties, they should be included in the mix. In the event of the use of a liquid additive, the ground material should be slowly dried at a high relative humidity (not more than 200° F. at 80% relative humidity, or a similar relationship) before screening. The grinding of the filler, methylolurea and other substances serves to effect a thorough mixing of the substances and to effect at least a partial incorporation of the resin forming substances or the partially formed resin in the pores of the filler. To facilitate the mixing and incorporation of the methylolurea in the pores of the filler suitable quantities of ethylene diamine may be added to form a paste-like mass. If desired the mass of methylolurea and filler admixed with ethylene diamine may be further diluted with isopropyl alcohol.

As an alternate procedure, the filler such as sawdust, wood chips, or other cellulosic or lignocellulosic fiber can be ground as a separate dry mass and after screening to size (40 to 80 mesh) placed in a pressure vessel and fully covered with an aqueous or alcoholic solution of monomethylolurea and/or sesquimethylolurea and/or dimethylolurea and such other of the above mentioned additives as are deemed necessary for the desired product. This solution was prepared by first dissolving the methylolurea in water or in ethylene diamine and then diluting with water or alcohol. The so produced mass should then be subjected to a pressure of 75 to 150 pounds per square inch for a period of 30 to 60 minutes to effect a thorough impregnation and adsorption of the binder chemicals and resins in the pores of the filler. The mass thus produced after drying is substantially equivalent to the mass resulting from the mixing by grinding and can be handled for further treatment in an identical manner.

It has been ascertained that the pressure treatment or grinding serves to carry the resins, plasticizers, and other chemicals into the coarse capillary structure of the filler. In order to insure a more thorough incorporation of the resins, etc., in the filler, a procedure should be followed to effect the diffusion of the resins, plasticizers, and other bonding chemicals into the cellular structure of the filler to effect a thorough treatment of all parts of the mass. Consequently, after the grinding and mixing or pressure treatment, the mass should be placed in a non-drying atmosphere for several days in order to provide for a complete diffusion of the resins and plasticizers and other chemicals throughout the particles of the filler. In the case of materials that should be dried to be screened, the aging process should be effected prior to drying and subsequent screening.

After aging or curing the mix for several days, it is then ready for molding. If it is desired to keep the mix for longer periods of time, this may be effected by maintaining the same with a free moisture content of at least 15 to 25% and at a temperature below 150° F. to prevent pre-polymerization.

As additive agents and/or catalysts to be used in very small quantities and to achieve specific qualities in the product or process during the preliminary mixing, molding or in the finished product, the following are included as being necessary: zinc stearate, hexamethylene tetramine, ethylene diamine, isopropyl alcohol, monoammonium acid phosphate, diammonium acid phosphate, liquid ammonia, ammonium hydroxide and other alkali hydroxides; zinc chloride, sodium fluoride, sodium arsenate, pentachlorophenol and other toxic materials; certain aromatic amines, i. e., aniline, o, m, and para toluidine, alpha and beta naphthylamine, p-toluolsulphonamid, phenyl ureas and phenyl guanidine and certain fire retardant materials to be listed in a later section of this application.

In the event that light colored or pastel dyes will be used, the cellulosic, lignocellulosic, or other filler material of a non-mineral or non-synthetic nature may be bleached in sodium or calcium hypochlorite or a peroxide (benzoyl, etc.).

It is recognized that certain characteristics of the finished product of this process—such as resistance to water, fungi, insects, decay, fire and weather—may be enhanced by the addition of various well known ingredients. This invention contemplates the use of such chemicals.

To provide an even precipitation and diffusion of dimethylolurea and/or sesquimethylolurea and/or monomethylolurea over all particles of filler and into their coarse capillary structure, the use of ethylene diamine and isopropyl alcohol in the manner hereinbefore described and in ratios of from 1-2 to 1-10 by volume will materially speed up the process of penetration—not only in sawdust but in chips and in dimension stock in a vacuum-pressure treatment process. High pH values, in the range of pH of 8.0 to pH of 12, have been found to aid the penetration of the wood by the methylolurea resin.

To obtain additional water resistance the following chemicals should be variously added (individually or severally where compatible) in quantities of from 1-7% by weight of the total mix: formaldehyde, furfural, furfuryl alcohol, acetaldehyde, ammonium hydroxide, liquid ammonia, aniline, o, m, and p. toluidine, alpha and beta naphthylamine, p-toluosulphonamide, phenyl ureas phenyl guanidine. Zinc stearate if added in these same percentages will also provide lubricating qualities that will enable easy removal of the molded product from the dies.

To obtain a toxic effect in items subject to insect or fungus attack, the following chemicals should be variously added (individually or severally where compatible) in quantities of .02-7% by weight of total mix, dependent upon their relatively toxic effect: sodium arsenate, zinc chloride, sodium fluoride, pentachlorophenol, dichlorobenzene, mercuric chloride, copper sulphate, dinitrophenylaniline, beta naphthol and copper hydroxide.

To obtain additional fire resistance, the following chemicals should be variously added (individually or severally where compatible) in quantities of .05–5% by weight of the total mix: monoammonium acid phosphate, diammonium acid phosphate, ammonium chloride, ammonium sulphate, sodium tetraborate, boric acid, borax, magnesium chloride and ammonia gas.

To add color to the molded product, the following dyes are recommended. These are not to be construed as limiting in number or type or color but are generally indicative of types that can be successfully used. Ordinarily a quantity of ½–1% by weight of the mix less the weight of the filler is sufficient to give good color in every instance:

1. A sodium salt of p-sulpho-o-toluene-azo-beta naphthol.
2. A sodium salt of p-nitrobenzene-azo-3:6 disulpho 1 amino-8 naphthol azo benzene.
3. A sodium salt of 4 benzene azo-1-p sulphobenzene-3-methyl-5 hydroxy pyrazol.
4. A sodium salt of benzylethyltetramethyl-pararosaniline disulphonic acid.
5. A sodium salt of 4-p-sulpho-benzene-azo-1-p-sulphophenyl-5 hydroxy-pyrazol-3-carboxylic acid.
6. A sodium salt of 4 sulpho gamma-naphthalene-azo-beta naphthol.
7. A sodium salt of 1:5 di-o-sulpho-p-tolyl-aminoanthraquinone.
8. A sulphonic acid of dialkylamino-phenyl-amino-phenyl naphtho-phenazonium chloride.
9. A sodium salt of p-aminobenzene-azo-3:6 disulpho-1-amino 8 naphthol azo-benzene.
10. A sodium salt of benzene-azo-benzene azo-beta naphthol 6:8 disulphonic acid.
11. A sodium salt of p-sulpho-benzene azo beta naphthol.
12. A sodium salt of p-sulphobenzene-azo-resorcinol azo-m-xylene.

Occasionally, the effect of the use of one or more of these additive agents is to initiate polymerization too rapidly for effective handling of the molding powder. In such an instance, the addition of chloral hydrate, and/or sodium hydroxide, and/or borax to alter the pH value to 6.0 or higher should be undertaken.

In molding, it has been found that the material may be handled similarly to virtually any other commercial molding powder. For injection molding, it can be preformed into pellets at low temperatures, 200 degrees F. maximum and 200 p. s. i., for use in any commercial injection molding machine. With the use of aldehyde additives preforming heats may go as high as 200–220 degrees F.

For actual molding procedure, it has been found that a molding time of 1–15 minutes, temperatures of 220–330 degrees F. and pressures of from 2000 p. s. i. to 3500 p. s. i. will produce hard resinous products substantially meeting the requirements as already set forth. Variations in temperature, pressure and time are dependent upon the ingredients used in the particular molding powder.

The press used for molding should have externally cooled platens in order that the molded product can be cooled before the removal of pressure. The material has a tendency to spring back unless fully cooled throughout to somewhat below its polymerization point.

The free moisture in the molding powder should remain below 10% by weight in order that excess moisture escaping as steam will not leave blowholes, fissures and cracks.

In accordance with the present invention the dimethylolurea and/or sesquimethylolurea and/or monomethylolurea diffuses into the cell wall of the wood filler and, it is understood, forms a chemical bond between the polar groups of the resins and the wood. At the same time the diffusing resin acts as a carrier for the other chemicals and additives so that not only a physical impregnation but a chemical union takes place. In such a manner, the resin and chemicals become homogeneously distributed and chemically combined with the wood throughout the cell wall structure. Such a process not only renders the wood less pervious to water, but provides for a thoroughly continuous, homogeneous state of the ingredients in the molding powder as opposed to the normal relation between a filler and a resin in which the filler simply floats as a separate body in the matrix of the resin.

The various chemicals in solution are assumed to enter into the fine microscopic structure of the wood cells, with the final result that the condensed resins completely fill the wood structure and do not simply form a coating over the individual cell walls as in the case of usual impregnation methods. The complete filling up of all parts of the structure removes the primary basis for the affinity of wood and water, and as a consequence practically eliminates dimensional changes in lumber and wood products exposed to varying moisture conditions.

This diffusion generally takes place with greater rapidity with sawdust or chips made from green wood (undried after its destruction as a living plant), or wood that has been thoroughly wetted down before beginning treatment.

The addition to the molding powder of acetic acid and/or borax and/or sodium hydroxide to produce in the compound pH values ranging from about 6.2 to 10.4 will materially influence the polymerization rate and stability of the powder. Actually, care should be exercised to maintain the mix during all phases of preparation from initial mixing to final molding, at a predetermined value within the above pH range.

In order to better illustrate how the present invention may be carried out, the following examples are given, although it should be understood that the invention is not to be limited to the specific compositions and procedures set forth therein.

*Example 1*

A composition was prepared which comprised by weight:

20% casein
50% ground sawdust
25% dimethylolurea
2% ammonium chloride
3% zinc chloride Sufficient ethylene diamine was incorporated in the mix to develop the mix into a heavy paste (the ethylene diamine was subsequently largely removed and need not be considered as part of the final ingredients of the composition. The above composition was prepared by grinding together the ingredients as described hereinbefore. The resulting composition after curing was dried to form a molding powder. Optimum pressure time for molding this composition was fifteen minutes and the best temperature and pressure was 230 to 240° F. and 3200 p. s. i., respectively.

Example 2

A composition was prepared from the following materials:

- 4% diammonium acid phosphate
- 46% dimethylolurea
- 50% ground sawdust

Ethylene diamine and isopropyl alcohol, in a ratio of 1 volume to 5, were added during the mixing. The composition was then prepared by the pressure method described earlier in the specification. After the pressure treatment, the material was cured and then dried to form a molding powder. A five-minute period at 4000 p. s. i. and 210 to 230° F. was suitable for molding this mix.

Example 3

Another molding composition was prepared which contained by weight:

- .02% pentachlorophenol
- 2% ammonium hydroxide
- 7.98% casein
- 50% short chopped ramie
- 40% dimethylolurea The materials were thoroughly mixed by grinding as previously described. After curing, grinding and screening for the proper size, the composition was molded by a ten-minute pressure period at 2000 p. s. i. and 210 to 220° F.

Example 4

A plastic composition was prepared which comprised by weight:

- 5.5% aniline
- 4% casein
- .5% dye
- 40% dimethylolurea
- 50% ground wood shavings The grinding method described earlier was used to thoroughly mix the ingredients in this example. After curing, drying and screening, the material was satisfactory for use as a molding powder. A ten-minute period at 2700 p. s. i. and 240 to 260° F. was satisfactory for molding this composition.

Example 5

A plastic composition was prepared from the following materials:

- 30% dimethylolurea
- 15% urea
- 55% short chopped hemp

Ethylene diamine and isopropyl alcohol were added in a ratio of 1 volume ethylene diamine to 8 volumes of isopropyl alcohol in sufficient quantity to make a thin paste. The composition was prepared by the grinding procedure and then the material was cured, dried and screened. A five-minute pressure time at 2000 p. s. i. and 230 to 240° F. was used to mold the above composition.

Example 6

Another plastic composition comprised of the materials listed below was prepared:

- 5% casein
- 9.5% urea
- 25% dimethylolurea
- 55% ground sawdust
- 3% formaldehyde
- 2% zinc stearate
- 5% dye The pressure method described earlier was used to prepare the molding composition from the materials listed above. After the pressure treatment the composition was cured and then dried and screened. Best results were obtained with the resulting molding powder by using ten minutes' molding pressure time at 280° F. and 4000 p. s. i.

Generally speaking, all samples were hard and glossy. The higher the pressures, the more pronounced were these characteristics. In these examples, the temperature ranges shown are narrow. However, the use of aldehydes provides for greater range in the case of other examples which might be quoted.

The rather long time factor shown in every case was due to the use of non artificially cooled platens for this particular series of tests. The material was allowed to remain in the platens until sufficiently cooled to be stable. With artificial cooling the time element could be considerably decreased.

While the invention has been described and illustrated herein with specific compositions, it is understood that the invention is not restricted to those compositions but is limited only by the following claims:

I claim:

1. A method of incorporating a methylolurea in a filler comprising dissolving the methylolurea in ethylene diamine and then mixing the solution with the filler.

2. A method of incorporating a methylolurea in a filler comprising dissolving the methylolurea in ethylene diamine, diluting the solution with a solvent from the group consisting of water and isopropyl alcohol and then mixing the solution with the filler.

3. A method of incorporating a methylolurea in a filler comprising dissolving the methylolurea in ethylene diamine, diluting the solution with isopropyl alcohol and then mixing the solution with the filler.

4. A method of preparing a moldable plastic composition comprising grinding a solid methylolurea having the least possible degree of polymerization with a filler material in the presence of a methylolurea solvent selected from the group consisting of ethylene diamine, mixtures of ethylene diamine and isopropyl alcohol and mixtures of ethylene diamine and water.

BRUCE E. ANDERSON.

REFERENCES CITED

The following references are of record in the file of this patent:

UNITED STATES PATENTS

| Number | Name | Date |
|---|---|---|
| Re. 22,147 | Howald | July 28, 1942 |
| 2,019,834 | Vierling | Nov. 5, 1935 |
| 2,192,129 | Ellis | Feb. 27, 1940 |
| 2,288,695 | Fuller | July 7, 1942 |
| 2,315,402 | D'Alelio | Mar. 30, 1943 |
| 2,318,121 | Widmer | May 4, 1943 |
| 2,321,544 | Dittmar | June 8, 1943 |
| 2,328,424 | D'Alelio | Aug. 31, 1943 |
| 2,334,545 | D'Alelio | Nov. 16, 1943 |
| 2,393,752 | D'Alelio | Jan. 29, 1946 |
| 2,404,910 | Keller | July 30, 1946 |